United States Patent
Lim

(10) Patent No.: US 6,182,087 B1
(45) Date of Patent: Jan. 30, 2001

(54) METHOD OF MODIFYING THE HOME LOCATION REGISTER (HLR) SYSTEM DATABASE FOR DIGITAL WIRELESS COMMUNICATION WHENEVER THE DATABASE CONTENTS OF MAIN MEMORY ARE ALTERED

(75) Inventor: Jae Yong Lim, Sungnam (KR)

(73) Assignee: Samsung Electronics Co., Ltd. (KR)

( * ) Notice: Under 35 U.S.C. 154(b), the term of this patent shall be extended for 0 days.

(21) Appl. No.: 09/048,872

(22) Filed: Mar. 26, 1998

(30) Foreign Application Priority Data

May 17, 1997 (KR) ................................. 97-019111

(51) Int. Cl.⁷ ..................................... G06F 17/30
(52) U.S. Cl. ..................... 707/204; 707/203; 707/201; 707/200; 455/433
(58) Field of Search ..................... 707/200, 201, 707/203, 204, 102; 455/433

(56) References Cited

U.S. PATENT DOCUMENTS

| | | | |
|---|---|---|---|
| 5,561,854 | * 10/1996 | Antic et al. | 455/433 |
| 5,675,785 | * 10/1997 | Hall et al. | 707/102 |
| 5,781,911 | * 7/1998 | Young et al. | 707/201 |
| 5,857,195 | * 1/1999 | Hayashi et al. | 707/102 |
| 5,873,101 | * 2/1999 | Klein | 707/204 |
| 6,032,158 | * 2/2000 | Mukhopadhyay et al. | 707/201 |

* cited by examiner

*Primary Examiner*—Thomas G. Black
*Assistant Examiner*—William Trinh
(74) *Attorney, Agent, or Firm*—Dilworth & Barrese, LLP

(57) ABSTRACT

The present invention provides a method for modifying the Home Location Register (HLR) system database for digital wireless mobile communication. The method modifies or revises the database of the HLR system that is used to manage mobile subscribers by maintaining all the wireless communication system subscribers' information such as electronic serial number, directory number, international mobile station identification, user profile and current location, etc. The method includes extracting subscriber information from the database which resides in a main memory device and is being used at the present time; migrating the extracted information to a new database; and saving the migrated information onto a disk. In addition, the present method automatically generates the structure and contents of the database to be modified, regardless of each database version and structure, and without requiring the modification and testing of the source code by an operator.

3 Claims, 1 Drawing Sheet

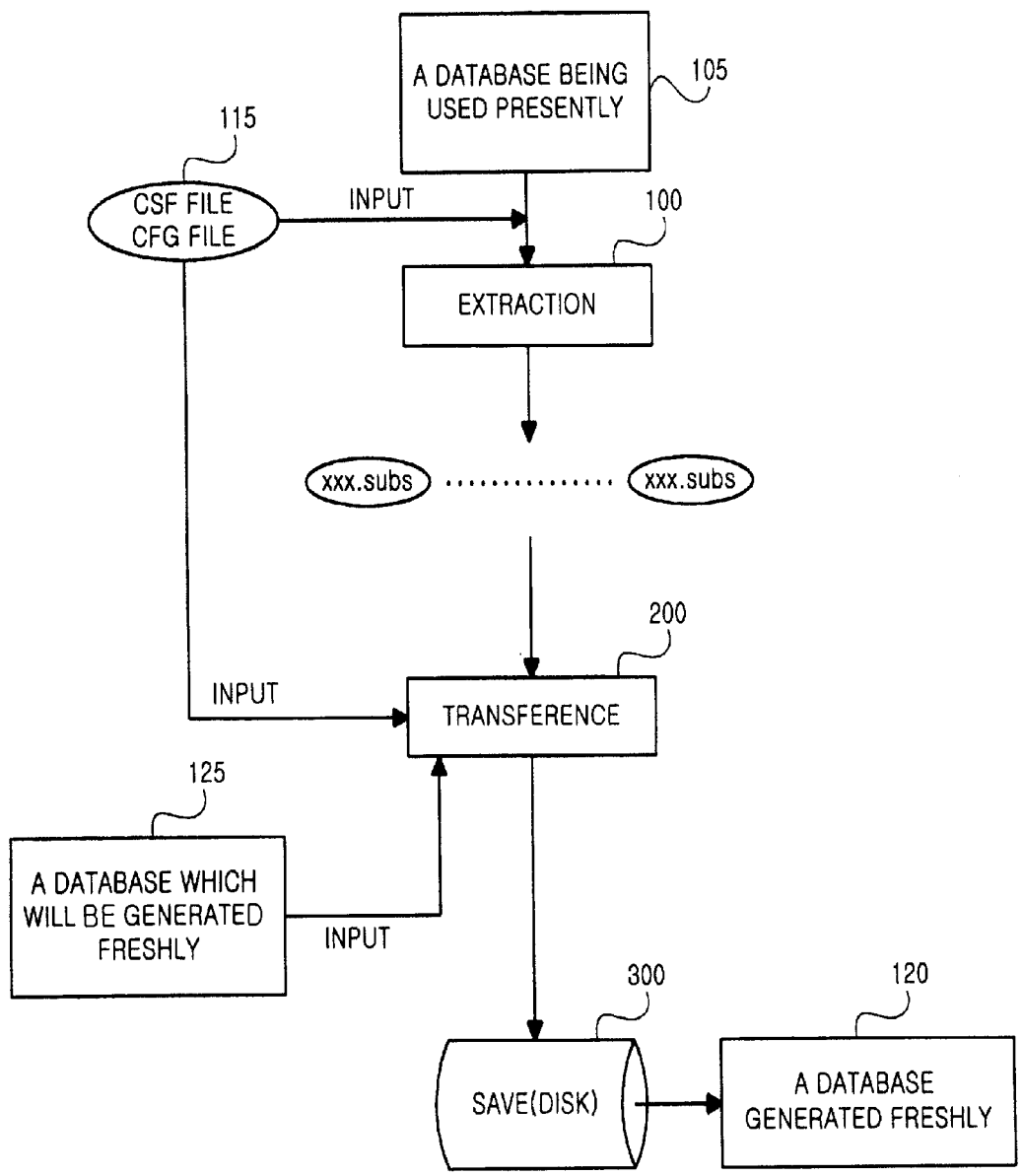

METHOD OF MODIFYING THE HOME LOCATION REGISTER (HLR) SYSTEM DATABASE FOR DIGITAL WIRELESS COMMUNICATION WHENEVER THE DATABASE CONTENTS OF MAIN MEMORY ARE ALTERED

BACKGROUND OF THE INVENTION

1. Field of the Invention

The present invention relates to a wireless communication system that uses a Code Division Multiple Access and a Personal Communications Service. More specifically, it relates to a method of modifying the Home Location Register (HLR) system database used to manage the subscribers in a digital wireless communication system.

2. Description of the Related Art

A Home Location Register (HLR) system is a functional unit that is used to manage mobile subscribers by maintaining all subscriber information such as electronic serial number, directory number, international mobile station identification, user profile and current location, etc. The HLR can serve many mobile switching centers (MSC) and can be arranged together or independently with the MSC to manage the mobile station in the wireless communication system.

The HLR system changes all the subscriber information to be managed into a database and saves it. The HLR system database is called the System Load Data (SLD) database in a wireless mobile communication system. The SLD database resides in the main memory device due to the limitation of the processing speed, and responds to various inquiries. The SLD also includes subscriber location information, additional service information, and other information. A change in the contents of the database in the memory influences the database to be saved on the disk.

In this type of SLD, when there is a necessity that the database structure is to be changed, or that a new additional service is to be added, the developer must modify and test source code one by one according to each database version and structure.

In the prior art method of modifying the SLD, the extent of database modification has to be determined based on the existence of the contents of each database. This is because since the database structure is different according to the contents of each. This requires the modification process of the database source program to be able to carry out the operation immediately.

The developer needs to revise and test the source code one by one to prepare the source program according to each database structure. Therefore, the management of these programs acts as another large burden. Especially, since there are a lot of problems at the beginning of system installation when frequent service development and modification are necessary. These types of modification work impose a burden on the program developer and the system users because of the management of a different source program according to the database structure and operator.

In other words, the databases to be used in the wireless mobile communication system requires the management of the source program for generating databases appropriate to each with different structure depending on the contents. Because this source program has different information as according to the operator, the database structure and the additional service, another program must be developed and managed according to each kind.

Therefore, many separate operations have to be performed to modify the database which results in a waste of time and human resources in the program developer and the system manager.

To solve the above problems, it is necessary that operations for database modification operations be integrated and processed as a program so that an ordinary person can easily and simply modify the database.

Thus, there is a necessity to develop a new, integrated program that can easily and conveniently modify the SLD database based on a fast, changing additional service request, and generate and revise the new database table regardless of the modification of the database structure and contents. In addition, the program can also serve by extracting information from the previous database to increase processing speed.

SUMMARY OF THE INVENTION

The present invention solves the above problem by providing a method to modify the HLR system database for a digital wireless mobile communication which generates a file for saving the previous database information and the database information to be made into a new database. The file includes the contents for the additional service to be added or deleted and the part of the database to be modified. The file is used as an input to generate the structure and contents, regardless of each database version and structure without requiring operator revision or testing of the source code.

To achieve the above object, the invention provides a method to modify the HLR system database for digital wireless mobile communication comprising the steps of: extracting necessary subscriber information from the SLD database which resides in a main memory device and is being used at the present time; migrating the extracted information to a new database; and saving said migrated information onto a disk.

In one embodiment, the extraction process comprises:
 receiving and parsing a conversion specification file (CSF) that has the information regarding the name and contents to extract from the present SLD database and the values desired to be changed, and a configuration file (CFG) which describes the information about the name, kit value, version, etc. for the database from which information will be extracted and the information of the name, kit value, version etc. for the newly made database;
 examining and extracting the subscriber information data by said two files from a previous System Load Data (SLD) database; and
 generating said extracted data into a subscriber file.

In one embodiment, the extraction of subscriber information uses the subscriber file to contain the information about the modified contents of the database. Also in the extraction process, it is preferable to make use of other processors by residing the migrated information in the main memory.

In another embodiment, the extracting process comprises the steps of: saving again the SLD database saved in the main memory and newly generated onto the hard disk in order to make the hard disk contents agree with the database contents in the main memory device; and automatically modifying and saving the database contents of said hard disk when the database contents of said main memory device is altered.

Another object of the invention is to provide a method for easily and simply generating a new HLR system database even when the information about the database contents and structure is not known.

A further object of the invention is to provide a method for modifying the HLR system database by modifying the input file which saves the information needed to develop a new program as related to each database version.

BRIEF DESCRIPTION OF THE DRAWINGS

Other objects and advantages of the invention will become apparent upon reading the following detailed description and upon reference to the drawing.

FIG. 1 is a block diagram of the method for modifying the HLR system database for a digital wireless mobile communication system according to an embodiment of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention makes it possible to operate existing multiple programs by integrating them into one, which were separated according to operation, database structure, and additional service. The present method makes it possible to generate a database easily and simply even when the information of the contents and the structure of the database is not known.

Also it is possible to carry out the desired work by only modifing the input file to save the information to be modified using an integrated program without the need to develop a new program by each version.

FIG. 1 shows a block diagram of the method to modify the HLR system database for a digital wireless mobile communication according to an embodiment of the present invention.

In order to carry out the extraction process (100) and the migration process (200), first the database which will be generated is loaded into a memory from the disk. If this is already loaded, it can be skipped.

The extraction process (100) is a process, which receives and parses the configuration (CFG) file having the information of the name and contents to extract from present database (105) and the information of the values to be changed. The CFG file describes the information of the name, kit value, version, etc. of the database to extract, and the information of the name, kit value, version, etc. of the database to be newly made.

The necessary data is extracted from the main memory device database which is loaded in the present memory by the two files (i.e. CSF and CFG) and saves the extracted data as a file.

In the parsing and extraction processes, since the database to be loaded into a memory has the shared kit value and start address, it is possible to extract the necessary data, if such information is needed, and the CSF, and CFG files are used as an input value.

The conversion specification file (CSF) contains the information about the attribute name, contents to extract from the present database and, the values to be changed. The CFG file has the information of the name, kit value, version, etc. of the database to extract and the name, kit value, version etc. of the database to be newly made.

The CSF file, as a conversion specification file, has the name and attribute of various tables of the SLD to be newly generated, and the scope of the field value.

The CSF file configuration is shown as follows:

‰
VERSION=NEW_SLD_Version

RELATION=NEW_Relation_Name
NEW_SLD_ATT_NAME_1[SIZE]=OLD_SLD_ATT_NAME_1[RANGE]
NEW_SLD_ATT_NAME_2[SIZE]=OLD_SLD_ATT_NAME_2[RANGE]
NEW_SLD_ATT_NAME_3[SIZE]=OLD_SLD_ATT_NAME_3[RANGE]
. . .
NEW_SLD_ATT_NAME_N-1[SIZE]=OLD_SLD_ATT_NAME_N-1[RANGE]
NEW_SLD_ATT_NAME_N[SIZE]=ODL_SLD_ATT_NAME_N[RANGE]

As shown above, NEW_SLD_ATT_NAME_N [SIZE] illustrates the attribute, the name and the size (in bytes) of the SLD, (i.e., in the database to be newly generated), and the OLD_SLD_ATT_NAME_N [RANGE] shows a range about the part to be used in the new SLD field, and a previous SLD attribute and size.

For example, the command, TEST_FIELD [3]=A[0-1] |UDVAL[00], means that the TEST_FIELD takes the first and second value of A in the previous database and the rest 1 byte is taken as 00 in the database that will be generated.

The initial value has to be taken, in case of making a new field that didn't exist before, like the CTIME [4]=UDVAL [19961010].

The data extracted through this process generates a fixed form of subscriber data file (XXX.subs) by the field order fit for database structure. The subscriber file consists of the raw data saving the information from the previous database.

The migration process (200) of the extracted data is a process which migrates the extracted information from the previous database to the database to be newly created. Other processors residing in the memory can use the migrated information which is migrated into the new database through this process.

The database which will be generated freshly (125) means the bulk database which has the structure of various existing databases. The specific parts of the contents of the database (105) are extracted according to the CSF file and CFG file (115) and saved in the file forms like ***.subs. The saved files combine the structure of a specific database among many databases (125) to generate a new database (120). The database (125) has other additional information and database structure. Through the extraction and migration processes, the system saves the new information into the bulk database (e.g. database with no subscriber information) which is loaded into the main memory device.

In order to create a new database, the migration process (200) reads the xxx.sub files containing the extracted information, adds to the bulk database to be loaded in the memory and saves the required information onto each field fit for the database structure including the information to be newly migrated. These kinds of processes are saved as an exact value by virtue of an inner algorithm and check routine.

The saving process (300) which saves the extracted information onto a disk saves the database information of the main memory device (e.g., like subscriber information) saved in the newly generated memory database onto a disk.

The database to be used in the mobile communication system must reside in the main memory device because of the limitations of processor speed. In addition, the present method must be capable of processing the queries. If the database is deleted from memory, it has to save the same information onto a disk in order to prepare for an abrupt crisis, as a result of a serious obstacle or increased load in a system usage. There is also another object to sustain data consistency because the database of the main memory device interworks with the database in a disk.

So as to carry out the saving process (300), the newly generated database saved in the memory has to be saved again onto the hard disk, with reference to the shared memory kit value and the database version. This process is used to recover the deleted database contents of the main memory device and has an object to make the database contents in the main memory agree with the contents in the hard disk.

Also the database contents of the disk are automatically changed and saved if the database contents in the main memory device are changed.

This database includes subscriber position information, the additional service information etc., and also the contents of the memory database to affect the saving of the database onto a disk.

The present invention makes it possible to modify the structure and function of the database by modifying only of the CSF and CFG files containing the information to extract from the database being presently used, in case that the contents and structure of database in the HLR system are to be used in a mobile communication system.

Furthermore, in an integrated environment, all works can be executed simultaneously in a first attempt at performing the change, and so the modification or the deletion of the database, in an operator's point of view, can be done more easily and simply, and it is possible that even an ordinary operator who doesn't know the database contents can operate easily and simply.

I claim:

1. A method for modifying an HLR system database for digital wireless mobile communication comprising the steps of:
    (a) extracting subscriber information from a database which resides in a main memory device and is currently being used, said extracting step further comprising the steps of:
        saving said database saved in said main memory device onto a hard disk in order to make said hard disk contents agree with said database contents in said main memory device, and
        modifying and saving said database contents of said hard disk whenever said database contents of said main memory device is altered,
    (b) migrating the extracted information to a new database; and
    (c) saving said new database onto said hard disk.

2. The method according to claim 1, wherein said step of extracting further comprises the steps of:
    (a) receiving and parsing a conversion specification file (CSF) that contains information relating to the name and contents to extract from the current database and values to be changed, and a configuration (CFG) file that contains information relating to the name, kit value, and file version, for the database that will be extracted and the information of the name, kit value, and version for a database that will be newly created;
    (b) examining and extracting data needed by the CSF and CFG files from a previously saved system load data (SLD) database; and
    (c) generating a subscriber file from the extracted data.

3. The method as set forth in claim 1, wherein said step of extracting subscriber information utilizes a conversion specification file (CSF) to contain information about modifying the contents of the HLR system database.

* * * * *